(12) United States Patent
Miller, II et al.

(10) Patent No.: US 11,413,719 B2
(45) Date of Patent: Aug. 16, 2022

(54) APPARATUS AND METHOD FOR ABRADING A COMPOSITE MATERIAL

(71) Applicant: The Boeing Company, Chicago, IL (US)

(72) Inventors: Richard Allen Miller, II, Seattle, WA (US); Narinder Kumar Gautam, Puyallup, WA (US)

(73) Assignee: The Boeing Company, Chicago, IL (US)

(*) Notice: Subject to any disclaimer, the term of this patent is extended or adjusted under 35 U.S.C. 154(b) by 775 days.

(21) Appl. No.: 16/361,904

(22) Filed: Mar. 22, 2019

(65) Prior Publication Data

US 2020/0298364 A1    Sep. 24, 2020

(51) Int. Cl.
*B24B 23/08* (2006.01)
*B23Q 9/00* (2006.01)
*B24B 19/00* (2006.01)
*E01B 31/17* (2006.01)

(52) U.S. Cl.
CPC ............ *B24B 23/08* (2013.01); *B23Q 9/0014* (2013.01); *B24B 19/004* (2013.01); *E01B 31/17* (2013.01)

(58) Field of Classification Search
CPC ... B24B 55/052; B24B 27/0076; B24B 47/20; B24B 23/08; B24B 7/005; B24B 7/12; B24B 7/17; B24B 19/004; B24B 49/16; B24B 55/05; E01B 31/17; B23Q 9/0007; B23Q 9/0014; B23Q 9/02
USPC ... 451/5, 179, 194, 261, 262, 344, 347, 429, 451/457
See application file for complete search history.

(56) References Cited

U.S. PATENT DOCUMENTS

| | | | |
|---|---|---|---|
| 3,823,455 A * | 7/1974 | McIlrath | E01B 31/17 451/236 |
| 6,953,394 B2 * | 10/2005 | Wendt | B23Q 11/0046 451/352 |
| 9,505,101 B1 | 11/2016 | Register | |
| 10,150,196 B2 | 12/2018 | Miller, II et al. | |
| 2018/0043493 A1* | 2/2018 | Miller, II | B24B 7/17 |

* cited by examiner

*Primary Examiner* — Joel D Crandall
*Assistant Examiner* — Robert F Neibaur
(74) *Attorney, Agent, or Firm* — Quinn IP Law

(57) ABSTRACT

Abrading apparatus and methods for treating opposing web surfaces of an elongate part include engaging the surfaces with first and second abrasion devices coupled to a frame. A drive assembly advances the frame along the part while the abrasion devices are operated to treat the surfaces. A guard assembly is coupled to the frame and includes first and second guards positioned to block portions of the contact areas of the first and second abrasion devices.

20 Claims, 14 Drawing Sheets

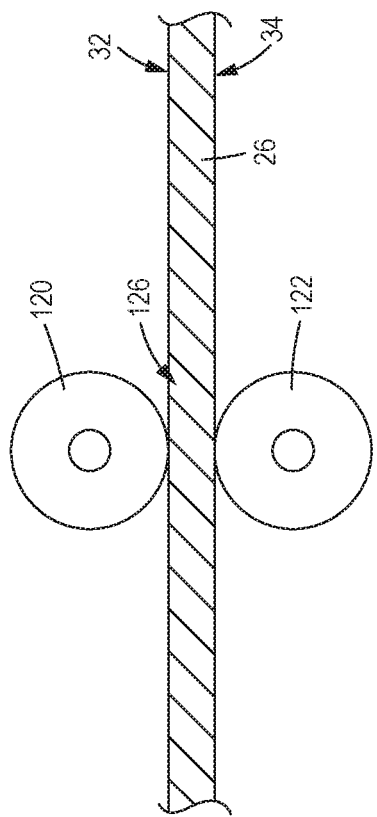
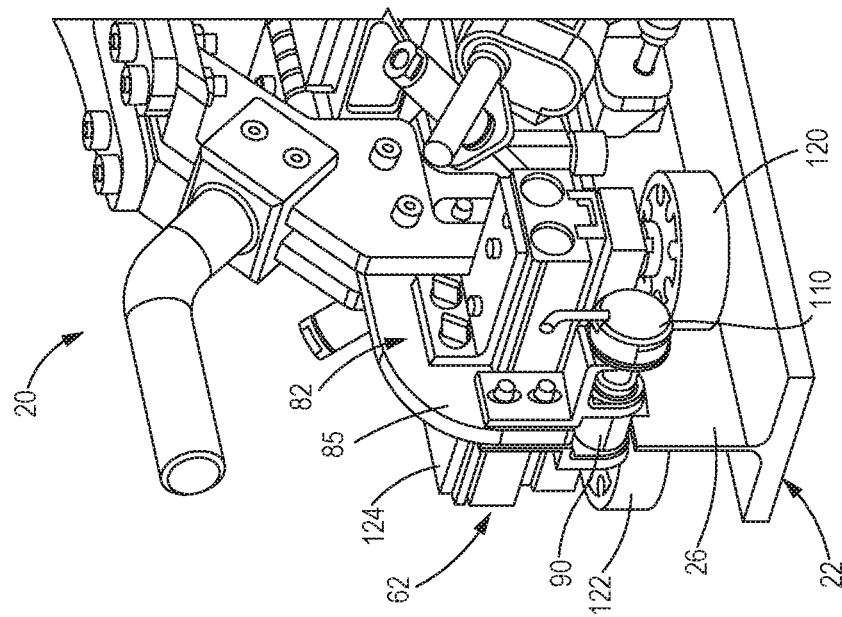
FIG. 9
FIG. 8

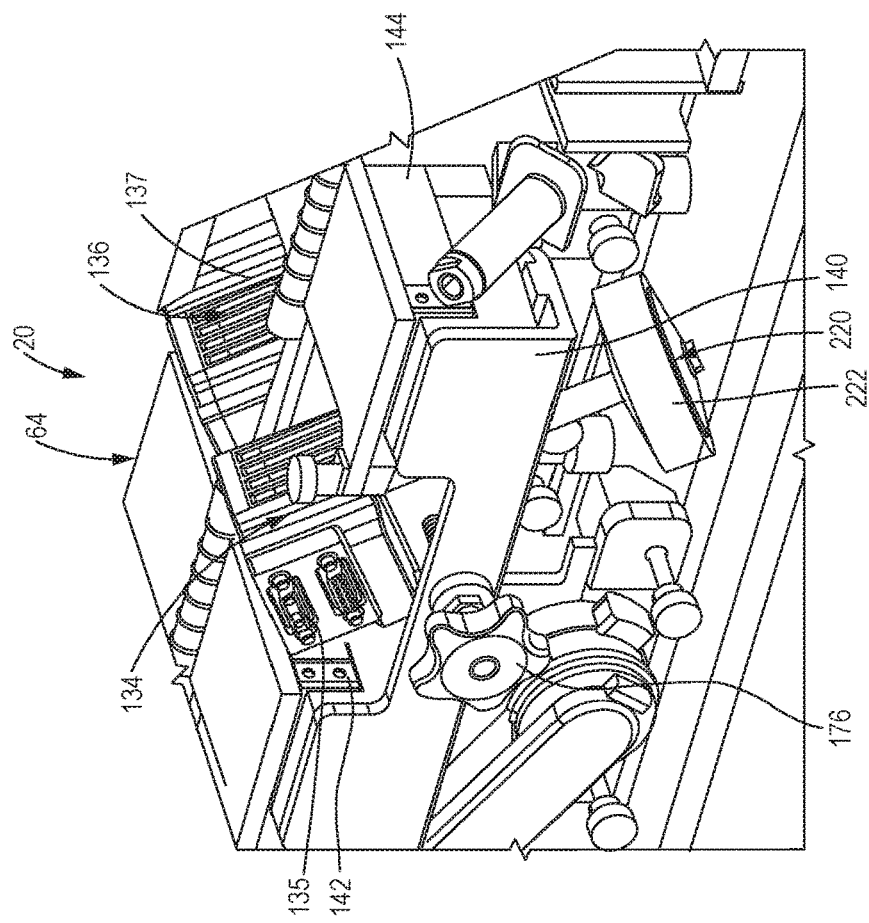

APPARATUS AND METHOD FOR ABRADING A COMPOSITE MATERIAL

FIELD

The present disclosure generally relates to surface preparation apparatus and methods and, more specifically, to apparatus and methods for abrading surfaces on parts formed of composite material.

BACKGROUND

Surfaces of large parts may require treatment prior to subsequent production steps. For example, aircraft wing structures may include stringers formed of a composite laminate material. During production, surfaces of the stringers may be treated in preparation for the application of coatings, such as primer or paint. Composite stringers are typically hand-sanded, which is labor-intensive, time-consuming, and may introduce ergonomic concerns. Additionally, there are challenges to ensuring consistent results from manual sanding of stringers such that there are minimal variations with respect to sanding depth across different sections of a given stringer as well as between multiple stringers.

SUMMARY

In accordance with one aspect of the present disclosure, an abrading apparatus is provided for use with an elongate part, the elongate part having a base and a web with a root end joined to the base and a free end opposite the root end, the web further defining opposed first and second web surfaces. The abrading apparatus includes a frame and a drive assembly coupled to the frame and configured to drive the abrading apparatus along a longitudinal length of the elongate part. An abrasion assembly includes a first abrasion device coupled to the frame having a first abrasion element with a first abrasion device, the first abrasion device defining a first abrasion device effective contact area engageable with the first web surface. The abrasion assembly further includes a second abrasion device coupled to the frame having a second abrasion element with a second abrasion device, the second abrasion device defining a second abrasion device effective contact area engageable with the second web surface. A guard assembly is coupled to the frame and includes a first guard disposed between the frame and the first abrasion element, wherein the first guard extends over a portion of the first abrasion device effective contact area, and a second guard disposed between the frame and the second abrasion element, wherein the second guard extends over a portion of the second abrasion device effective contact area. A controller for controls operation of the drive assembly, the first abrasion device, and the second abrasion device In accordance with another aspect of the present disclosure, an abrading apparatus is provided for use with a stringer, the stringer having a base and a web having a root end joined to the base and a free end opposite the root end, the web further defining opposed first and second web surfaces. The abrading apparatus includes a frame and a drive assembly coupled to the frame and configured to drive the abrading apparatus along a longitudinal length of the stringer. The abrading apparatus further includes an abrasion assembly having a first carriage coupled to the frame by a first power operated slide, a first rotary sander coupled to the first carriage and including a first rotary sander element having a first rotary sander surface, the first rotary sander surface defining a first rotary sander effective contact area engageable with the first web surface, and a first orbital sander coupled to the first carriage and including a first orbital sander element having a first orbital sander surface, the first orbital sander surface defining a first orbital sander effective contact area engageable with the first web surface. The abrasion assembly further includes a second carriage coupled to the frame by a second power operated slide, a second rotary sander coupled to the second carriage and including a second rotary sander element having a second rotary sander surface, the second rotary sander surface defining a second rotary sander effective contact area engageable with the second web surface, and a second orbital sander coupled to the second carriage and including a second orbital sander element having a second orbital sander surface, the second orbital sander surface defining a second orbital sander effective contact area engageable with the second web surface. A guard assembly is coupled to the frame and includes a first guard positioned to extend over portions of the first rotary sander effective contact area and the first orbital sander effective contact area, and a second guard positioned to extend over portions of the second rotary sander effective contact area and the second orbital sander effective contact area. A controller controls operation of the drive assembly, the first rotary sander, the first orbital sander, the second rotary sander, the second orbital sander, the first power operated slide, and the second power operated slide.

In accordance with a further aspect of the present disclosure, a method of abrading a stringer is provided, in which the stringer has a base and a web with a root end joined to the base and a free end opposite the root end, the web further defining opposed first and second web surfaces. The method includes positioning an abrading apparatus relative to the stringer with first and second abrasion devices engaging the first and second web surfaces, respectively, placing a first guard of the abrading apparatus between the first web surface and a portion of a first abrasion device effective contact area associated with the first abrasion device, and placing a second guard of the abrading apparatus between the second web surface and a portion of a second abrasion device effective contact area associated with the second abrasion device. The method further includes, while advancing the abrading apparatus along the stringer, simultaneously operating the first and second abrasion devices to abrade the first and second web surfaces, respectively, at unblocked portions of the first and second abrasion device effective contact areas.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of illustrative examples of the present disclosure when read in conjunction with the accompanying drawings, wherein:

FIG. 8 is a perspective view of an idler assembly forming part of the abrading apparatus of FIG. 1.

FIG. 9 is a plan view, in cross-section, of the idler assembly of FIG. 8.

FIG. 10 is a perspective view of an abrasion device provided with an abrasion assembly forming part of the abrading apparatus of FIG. 1.

FIG. 11 is a perspective view of another abrasion device provided with the abrasion assembly forming part of the abrading apparatus of FIG. 1.

DETAILED DESCRIPTION

The following detailed description is of the best currently contemplated modes of carrying out the apparatus and methods disclosed herein. The description is not to be taken in a limiting sense, but is made merely for the purpose of illustrating general principles, as the scope of this disclosure is best defined by the appended claims.

Figure 1:
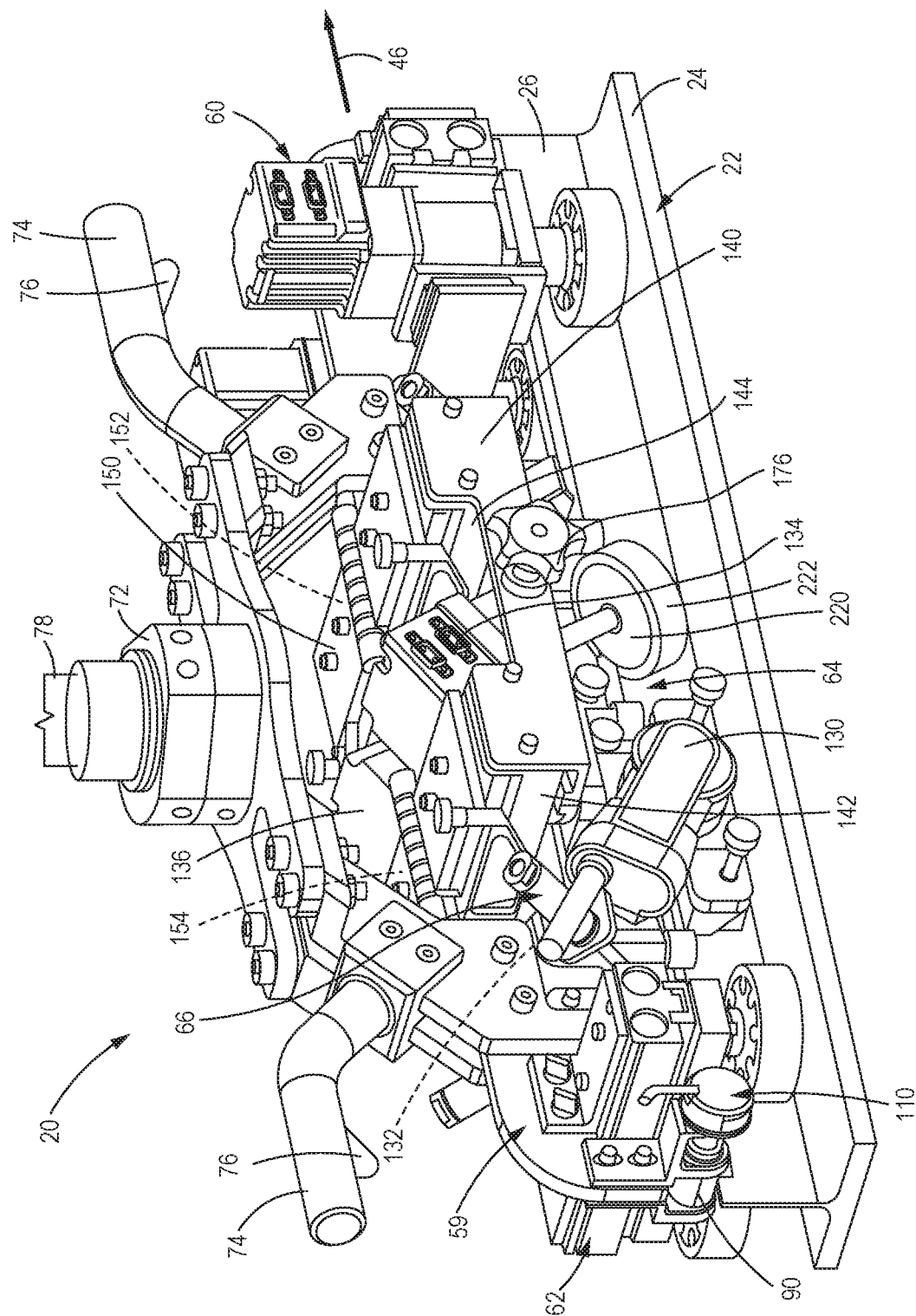
FIG. 1 is a perspective view of an abrading apparatus according to the present disclosure.
Figure 2:
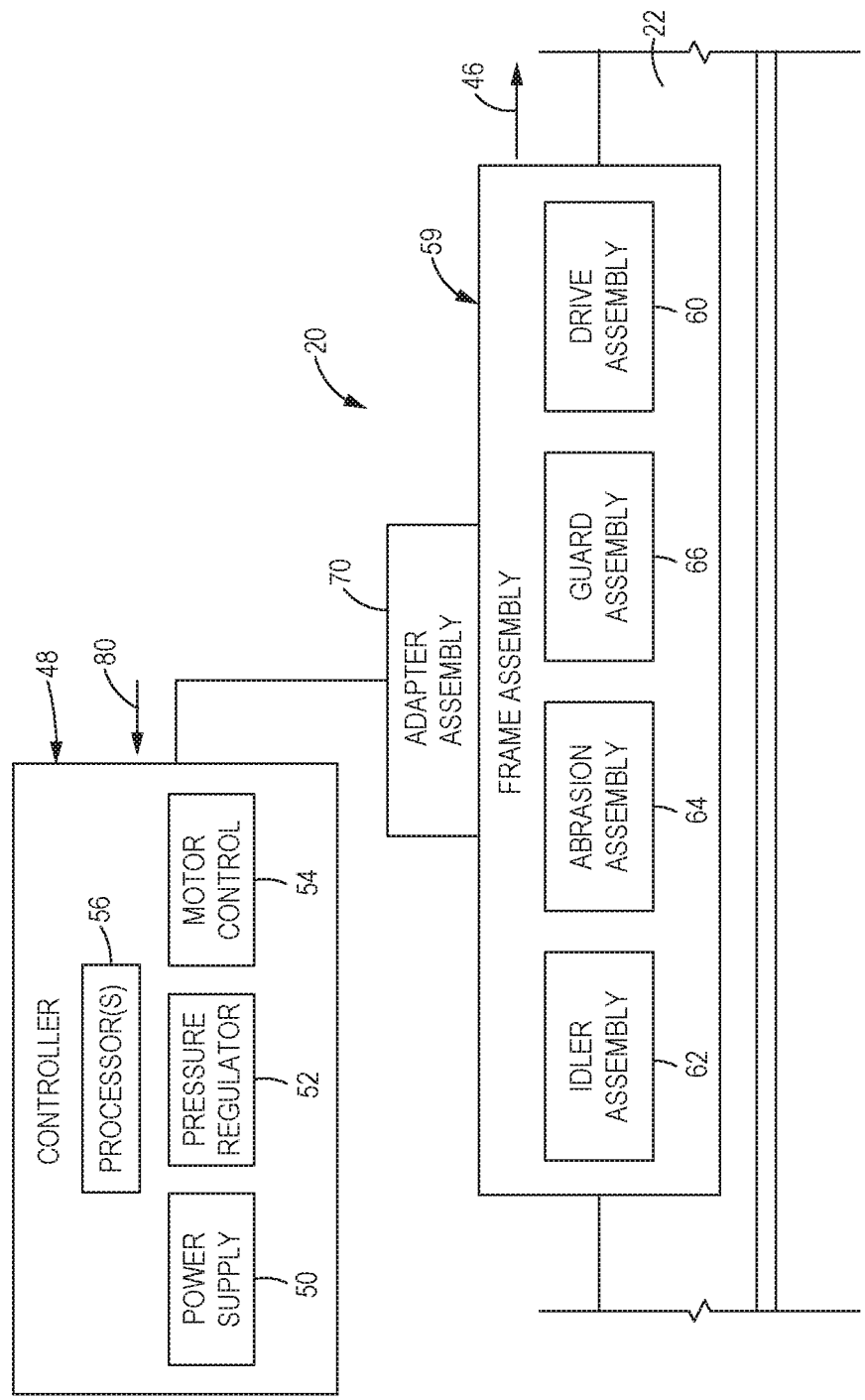
FIG. 2 is a schematic illustration of the abrading apparatus of FIG. 1 shown sanding surfaces of a stringer.
Figure 3:
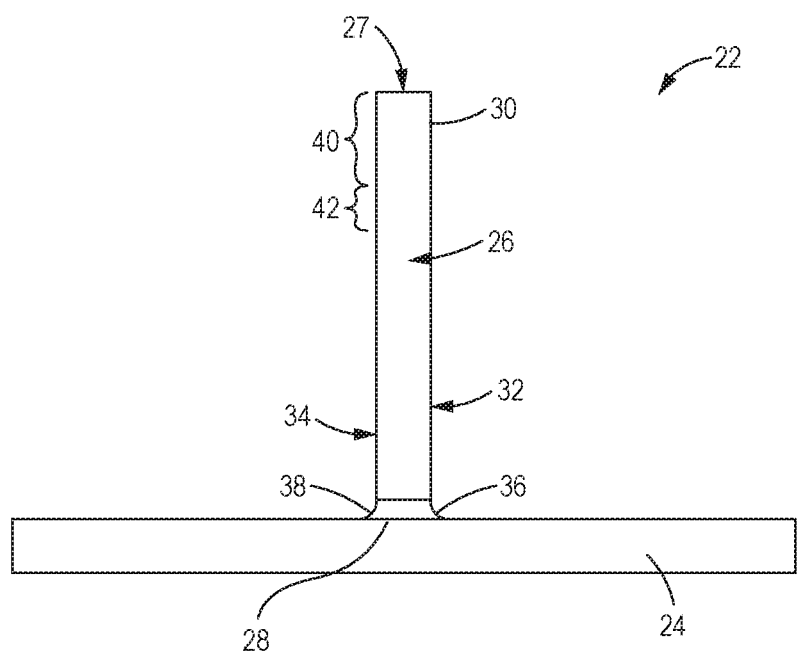
FIG. 3 is an enlarged side elevation view of the stringer shown in FIG. 2.

FIGS. 1 and 2 illustrate an automated abrading apparatus 20 for treating surfaces of an elongate part. In one application, the elongate part is a blade stringer 22 formed of composite laminate material, as shown in FIG. 3. The stringer 22 includes a base 24 and a web 26. The web 26 includes a root end 28 joined to the base 24 and a free end 30 opposite the root end 28. The web 26 further defines oppositely facing first and second web surfaces 32, 34. Base fillet radiuses 36, 38 may be formed at transitions between the first and second web surfaces 32, 34, respectively, and the base 24. In some applications, portions of the web 26 are designated as a cap edge treatment section 40 and a bare carbon strip section 42.

The abrading apparatus 20 is configured to sand resin off of the first and second web surfaces 32, 34 while avoiding cutting into the fibers of the laminate composite material. In some embodiments, the abrading apparatus 20 itself blocks certain areas of the web 26, such as the cap edge treatment section 40, from exposure to abrasion, thereby eliminating the need to separately mask those areas prior to sanding. As will be better understood below, the abrading apparatus 20 automatically advances down the stringer 22 in a forward direction 46 while maintaining a uniform depth of cut to remove a pre-calibrated amount of material from the first and second web surfaces 32, 34. The fully automated abrading apparatus 20 is operated by a controller 48 which may include, without limitation, a power supply 50, one or more pressure regulators 52, a motor control 54, and one or more processors 56.

As schematically illustrated in FIG. 2, the abrading apparatus 20 includes a frame assembly 59 supporting a drive assembly 60, an idler assembly 62, an abrasion assembly 64, and a guard assembly 66. The abrading apparatus 20 also includes an adapter assembly 70 having a lift adapter 72, a pair of spaced apart handgrips 74, and toggle switches 76, as best shown in FIG. 1. The lift adapter 72 permits interfacing with a lift arm 78 that can support the weight of the abrading apparatus 20 independent of the stringer 22, thereby minimizing the load applied to the stringer during abrading operations. With the abrading apparatus 20 supported and positioned relative to the stringer 22 by the lift arm 78, an operator may use the handgrips 74 to make fine position adjustments. The operator initiates a sanding (or other surface treatment) operation by actuating the toggle switches 76 which cause a start-of-cycle signal 80 to be sent to the controller 48. The drive assembly 60 functions to both clamp the abrading apparatus 20 on the stringer 22 as well as drive it along a length of the stringer 22 in the forward direction 46. The idler assembly 62 also clamps and centers the abrading apparatus 20 on the stringer 22. The abrasion assembly 64 includes multiple abrasion devices, such as orbital sanders and rotary sanders, positioned to sand the first and second web surfaces 32, 34, however other power driven surface treatment tools, including material removal tools, may be employed instead of sanders.

Figure 4:
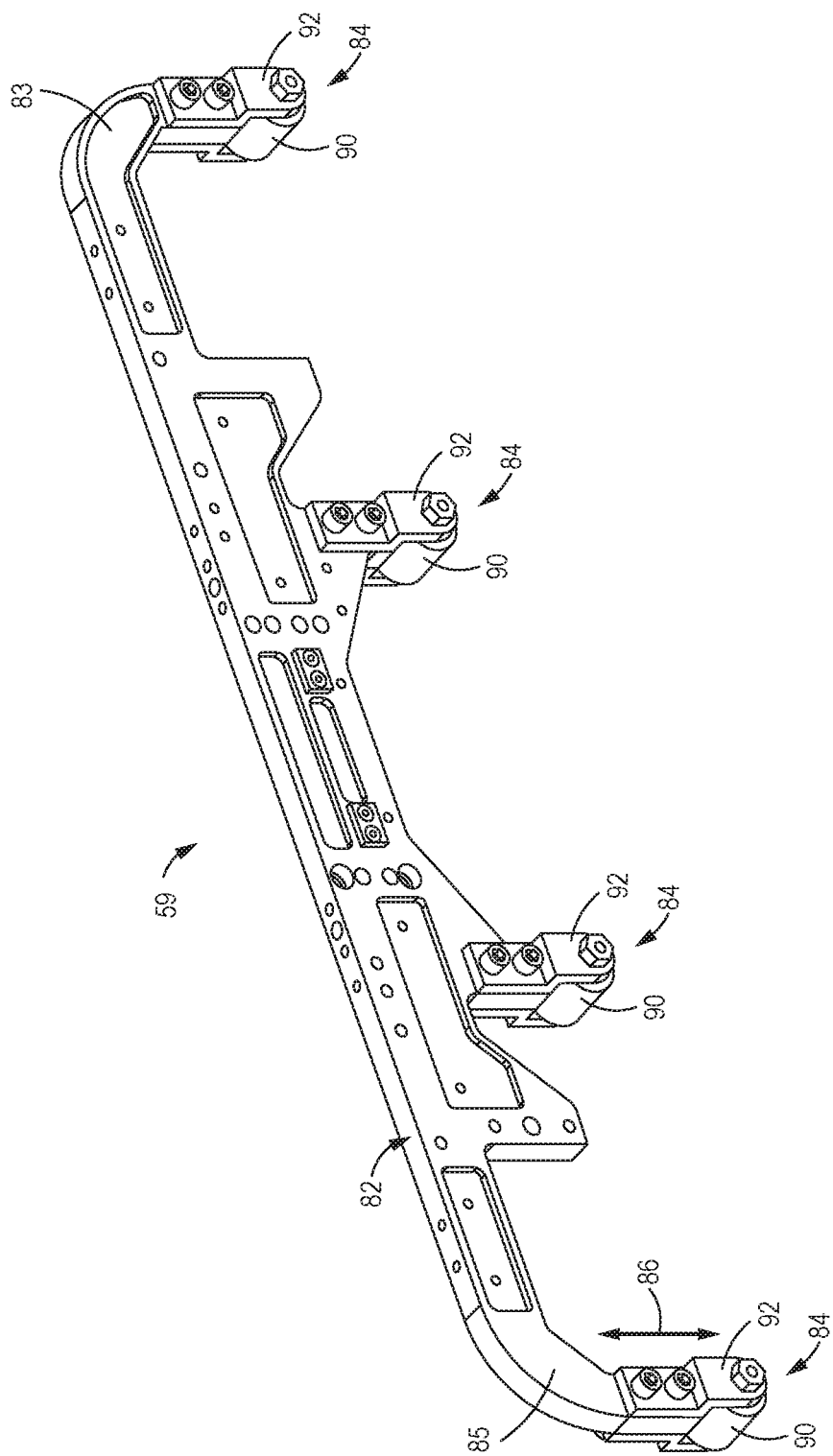
FIG. 4 is a perspective view of a frame assembly forming part of the abrading apparatus of FIG. 1.
Figure 5:
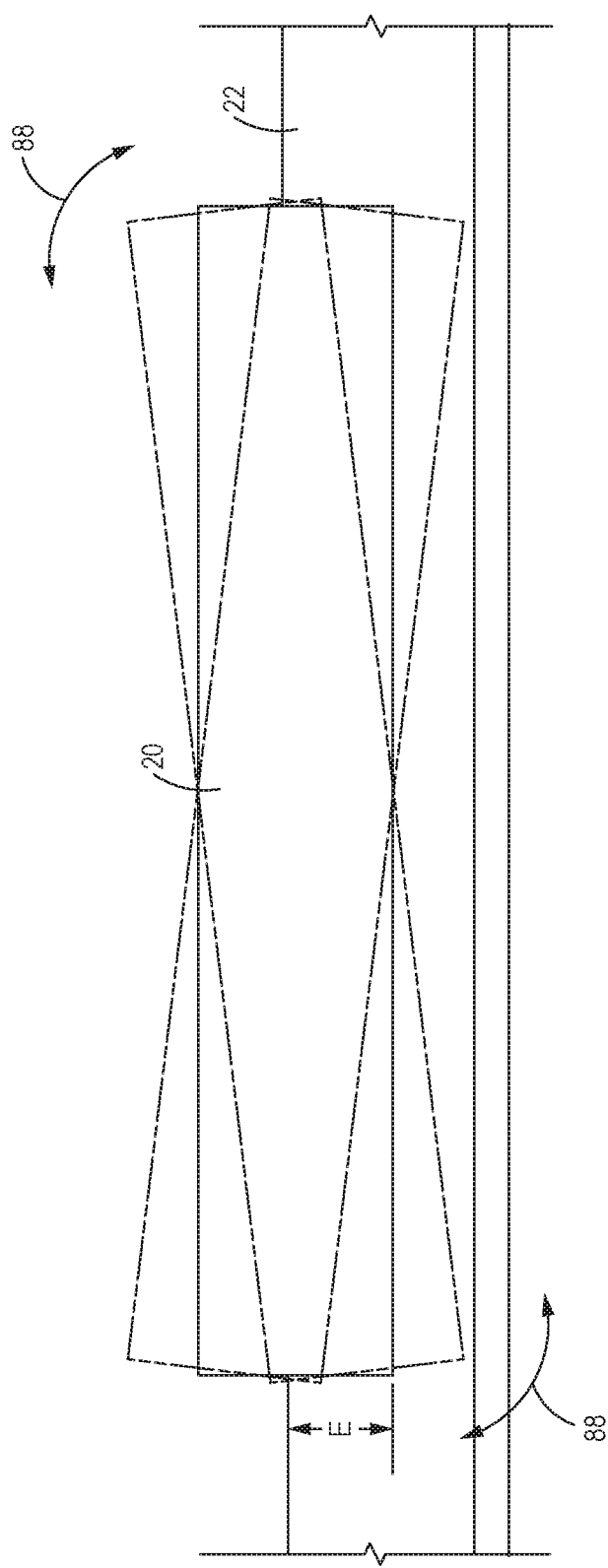
FIG. 5 is a diagrammatic side view of the frame assembly of FIG. 4, illustrating pitch adjustment of the abrading apparatus.

Referring now to FIGS. 4 and 5, the frame assembly 59 includes an elongate, one-piece frame 82 formed of any suitable rigid material, such as aluminum. The frame 82 extends from a forward end 83 to a rearward end 85. Four longitudinally spaced apart roller arm assemblies 84 are mounted on the frame 82 and include adjustment 86 for changing the pitch 88 (FIG. 5) as well as the elevation "E" of the abrading apparatus 20 relative to the stringer 22. The roller arm assemblies 84 effectively control sanding height and angle of attack of later-discussed sanders forming part of the abrasion assembly 64. Each of the roller arm assemblies 84 includes a roller 90 mounted for rotation on an arm 92, which in turn is mounted for adjustment 86 on the frame 82. The rollers 90 engage a portion of the stringer 22, which in the illustrated example comprises a top edge 27 of the web 26.

Figure 7:
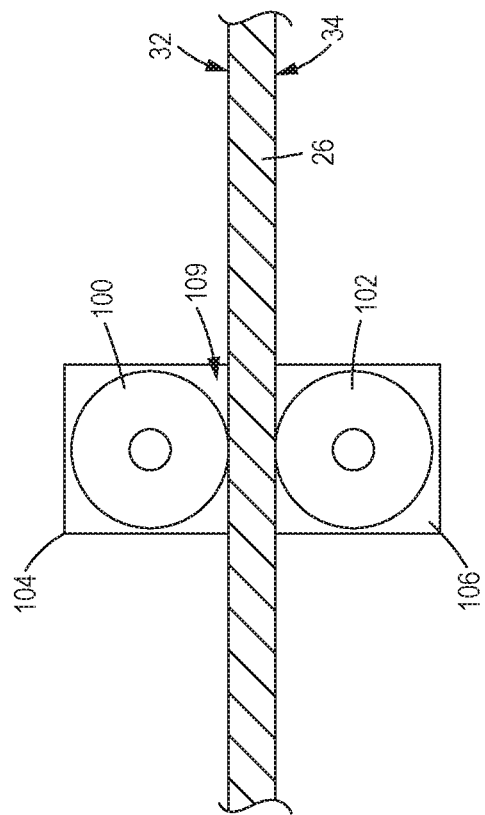
FIG. 7 is a plan view, in cross-section, of the drive assembly of FIG. 6.
Figure 6:
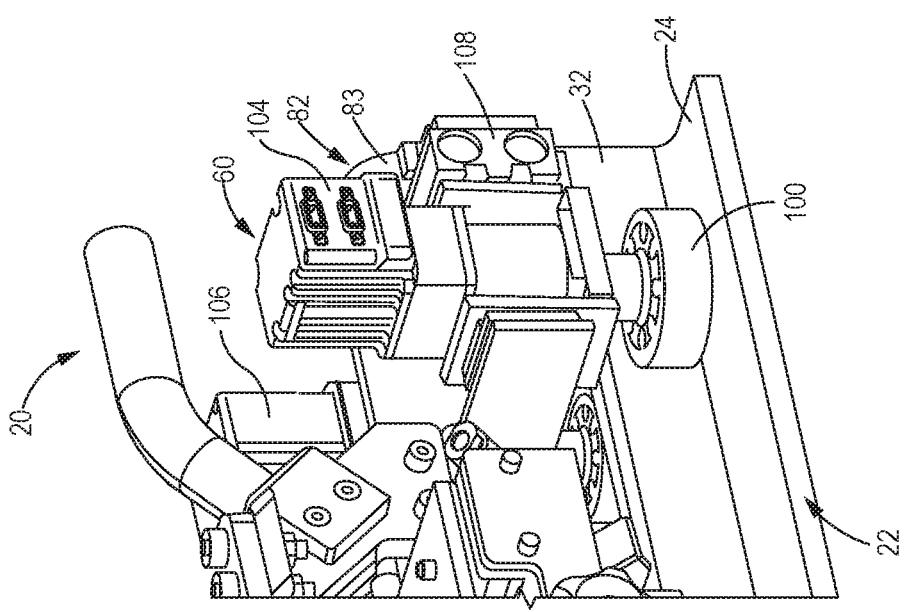
FIG. 6 is an enlarged perspective view of a drive assembly forming part of the abrading apparatus of FIG. 1.

FIGS. 1, 6, and 7 illustrate the details of the self-centering drive assembly 60 coupled to the forward end 83 of the frame 82. The drive assembly 60 broadly comprises first and second wheels 100, 102 operably coupled to first and second drive motors 104, 106, respectively. The first and second drive motors 104, 106 are responsive to respective first and second drive signals to rotate the first and second wheels 100, 102 at first and second rotational speeds. The controller 48 is operatively coupled to the first and second drive motors 104, 106 and programmed to generate the first and second drive signals. During typical operation, the first rotational speed and the second rotational speed are substantially equal and constant so that the abrading apparatus 20 translates over the stringer 22 at a substantially constant traverse speed. Each of the first and second drive motors 104, 106 may be provided as a commercially available, so-called smart motor, which is a programmable, integrated servo motor system that includes a motor, encoder, amplifier, and controller. The first and second wheels 100, 102 are formed of a material, such as neoprene, that is somewhat compliant but is capable of gripping the first and second web surfaces 32, 34. In some applications, the first and second wheels 100, 102 may be angled toward the base 24 of the stringer 22 relative to the forward direction 46, thereby to ensure the abrading apparatus 20 remains engaged with the stringer 22. The pitch 88 of the frame 82 may be adjusted to provide the desired angle of the first and second wheels 100, 102.

The first and second drive motors 104, 106 are coupled to a drive actuator 108 for laterally positioning the first and second wheels 100, 102 relative to the frame 82. The drive actuator 108 may include a pneumatic piston operatively coupled to the pressure regulator 52 provided with the controller 48, thereby to control lateral distances between the frame 82 and the first and second wheels 100, 102, so that the web 26 of the stringer 22 is received within a nip 109 (FIG. 7) and clamped between the first and second wheels 100, 102. The amount of clamping force applied by the first and second wheels 100, 102 is determined by the drive actuator 108 and may be varied, depending on the application. The drive actuator 108 may be controlled so that the forward end 83 of the frame 82 is aligned with the web 26. In some examples, the drive actuator 108 is provided as a pneumatically operated gripper.

The drive assembly 60 further may include an encoder 110 for determining an actual traverse distance of the abrading apparatus 20 along the stringer 22. AS best shown in FIGS. 1 and 8, the encoder 110 may be coupled to and rotate with one of the rollers 90 that engages the top edge 27 of the web 26. The controller 48 is operatively coupled to the encoder 110 and is programmed to calculate a command traverse distance based on the first and second drive signals, compare the command traverse distance with the actual traverse distance of the abrading apparatus 20 determined by the encoder 110, and generate a slip signal when the command traverse distance exceeds the actual traverse distance by a threshold slip distance. In this manner, the drive assembly 60 quickly identifies a slip event, in response to which the controller 48 will shut down operation, thereby to prevent over-abrasion of a section of the stringer 22.

The idler assembly 62 centers the rearward end 85 of the frame 82. More specifically, as best shown in FIGS. 1, 8, and 9, the idler assembly 62 includes a first idler wheel 120 and a second idler wheel 122 coupled to the frame 82 by an idler actuator 124. The idler actuator 124 is operatively coupled to the pressure regulator 52 provided with the controller 48, thereby to control lateral distances between the frame 82 and the first and second idler wheels 120, 122. The idler actuator 124 is operated so that the web 26 of the stringer 22 is received within an idler nip 126 (FIG. 9) and clamped between the first and second idler wheels 120, 122. The first and second idler wheels 120, 122 are journally supported to rotate as the abrading apparatus 20 traverses the stringer 22. The amount of clamping force applied by the first and second idler wheels 120, 122 is determined by the idler actuator 124 and may be varied, depending on the application. The idler actuator 124 may be controlled so that the rearward end 85 of the frame 82 is aligned with the web 26. The first and second idler wheels 120, 122 are formed of a material, such as neoprene, that is somewhat compliant but is capable of gripping the first and second web surfaces 32, 34. In some examples, the idler actuator 124 is provided as a pneumatically operated gripper.

The abrasion assembly 64 abrades material from the first and second web surfaces 32, 34. In the example illustrated in FIGS. 1, 10, and 11, the abrasion assembly 64 has four abrasion devices, namely a first orbital sander 130, a second orbital sander 132, a first rotary sander 134, and a second rotary sander 136. It will be appreciated, however, that two, three, or more than four abrasion devices may be used. At least two of the abrasion devices are mounted in face-to-face opposing relationship so that the first and second web surfaces 32 may be abraded simultaneously. In the illustrated example, the first and second orbital sanders 130, 132 face each other from opposite sides of the frame 82, while the first and second rotary sanders 134, 136 face each other from opposite sides of the frame 82. The first and second orbital sanders 130, 132 are pneumatically operated and operably coupled to the pressure regulator 52 of the controller 48. The first and second rotary sanders 134, 136 have first and second abrasion motors 135, 137 operably coupled to the controller 48. While the abrasion devices are shown herein as orbital and rotary sanders, it will be appreciated that other types of surface treatment tools, including material remover tools such as grinders or polishers may be employed, depending on the application.

The abrasion devices of the abrasion assembly 64 are supported for adjustment in a lateral direction relative to the frame 82. More specifically, as best shown in FIGS. 1 and 10, a first carriage 140 is coupled to one side of the frame 82 by a first pair of power operated slides 142, 144. Similarly, a second carriage 150 is coupled to an opposite side of the frame 82 by a second pair of power operated slides 152, 154. The first orbital sander 130 and the first rotary sander 134 are coupled to the first carriage 140, while the second orbital sander 132 and the second rotary sander 136 are coupled to the second carriage 150. Each of the power operated slides 142, 144, 152, 154 has an adjustable length in the lateral direction, thereby to adjust lateral distances of the abrasion devices relative to the frame 82. The power operated slides 142, 144, 152, 154 may include pneumatic cylinders operatively coupled to the pressure regulator 52, thereby allowing the controller 48 to control lateral positioning of the abrasion devices.

A self-orienting mounting assembly 160 is used to couple each of the first and second orbital sanders 130, 132 to the first and second carriages 140, 150, respectively. More specifically, as best shown in FIG. 10, the mounting assembly 160 includes a bracket 162 coupled to the first carriage 140 by a gimbal joint 164. The gimbal joint 164 includes a semi-spherical socket 166 and a fastener 168 having a semi-spherical head that mates with the socket 166, thereby to permit the bracket 162 to pivot in three dimensions relative to the first carriage 140. Additionally, the mounting assembly 160 includes a first pair of abrasion device cam followers 170 positioned on opposite sides of the first orbital sander 130 and configured to engage the first web surface 32. Each of the abrasion device cam followers 170 is adjustable relative to the bracket 162 in a lateral direction, such as by adjustment screws 172 extending between the bracket 162 and each abrasion device cam follower 170, thereby to set a cut depth at which the first orbital sander 130 will abrade into the first web surface 32. An identical mounting assembly 160 is used to couple the second orbital sander 132 to the second carriage 150.

The gimbal joint 164 and the abrasion device cam followers 170 permit the first and second orbital sanders 130, 132 to maintain orientations and cut depths even when a thickness of the web 26 varies. More specifically, the first pair of power operated slides 142, 144 may be operated to hold the first carriage 140 in position with a first bias force directed toward the frame 82. The first bias force engages the first orbital sander 130 into the web 26 with sufficient pressure to abrade the first web surface 32. Should the thickness of the web increase, however, engagement of the abrasion device cam followers 170 with the first web surface 32 may generate a first cam force directed away from the frame 82. When the first cam force exceeds the first bias force, the first orbital sander 130 and first carriage 140 will move away from the frame 82. Simultaneously, gimbal joint 164 permits the first orbital sander 130 to pivot as needed to maintain a flush orientation with the first web surface 32. In this manner, a consistent cut depth is maintained even when the web 26 has a varying thickness. As noted above, the same mounting assembly 160 couples the second orbital sander 132 to the second carriage 150, so that the second orbital sander 132 will also maintain the desired orientation and cut depth relative to the second web surface 34.

The first and second rotary sanders 134, 136 also are supported for lateral adjustment relative to the first and second carriages 140, 150, respectively. As illustrated in FIGS. 1 and 11, an adjustment screw 176 extends between each of the first and second carriages 140, 150 and the first and second rotary sanders 134, 136, respectively. Rotation of the adjustment screws 176 will change the lateral positions of the first and second rotary sanders 134, 136 relative to the frame 82, thereby to set desired cut depths. Additionally, subsequent adjustment of the lateral positions of the first and second rotary sanders 134, 136 may be needed as the sanders wear down.

Figure 12:
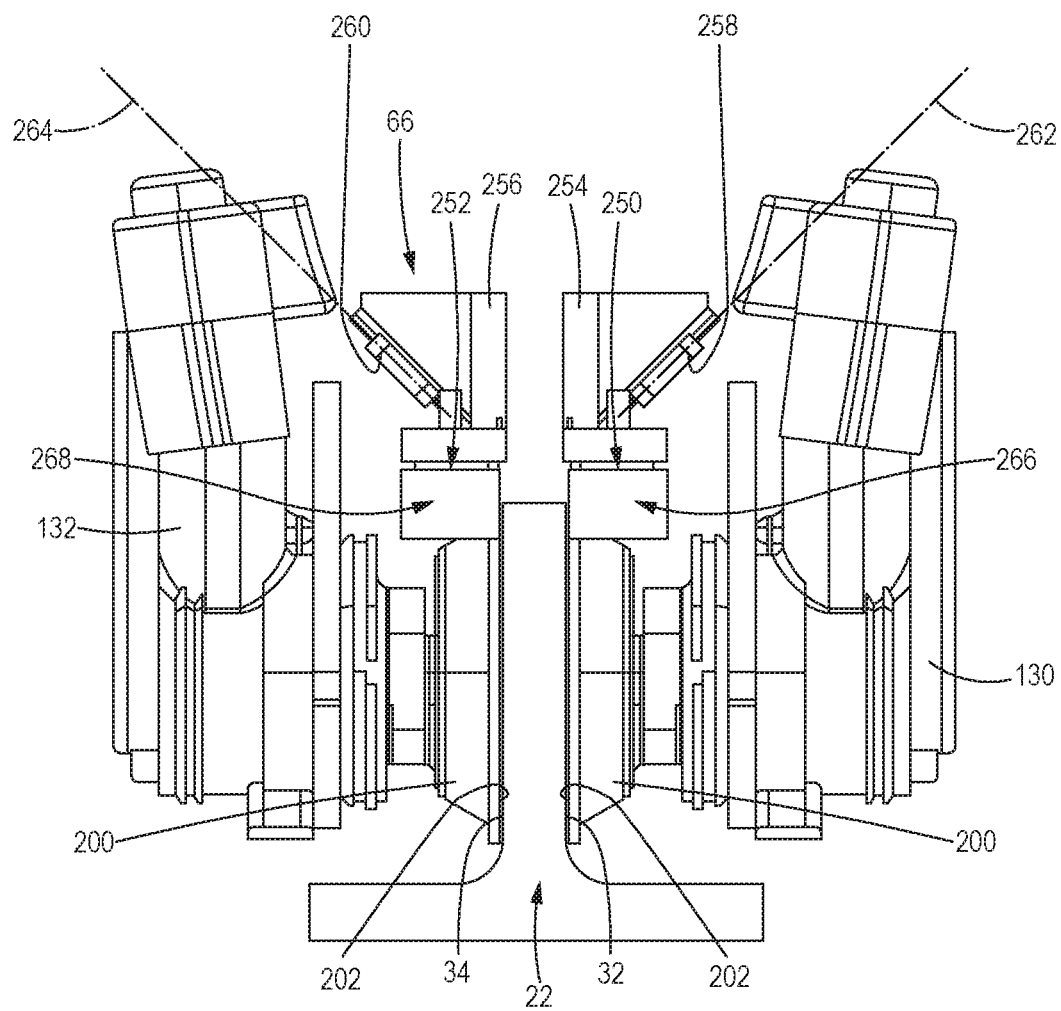
FIG. 12 is a side elevation view of the abrasion assembly and a guard assembly forming part of the abrading apparatus of FIG. 1.
Figure 13:
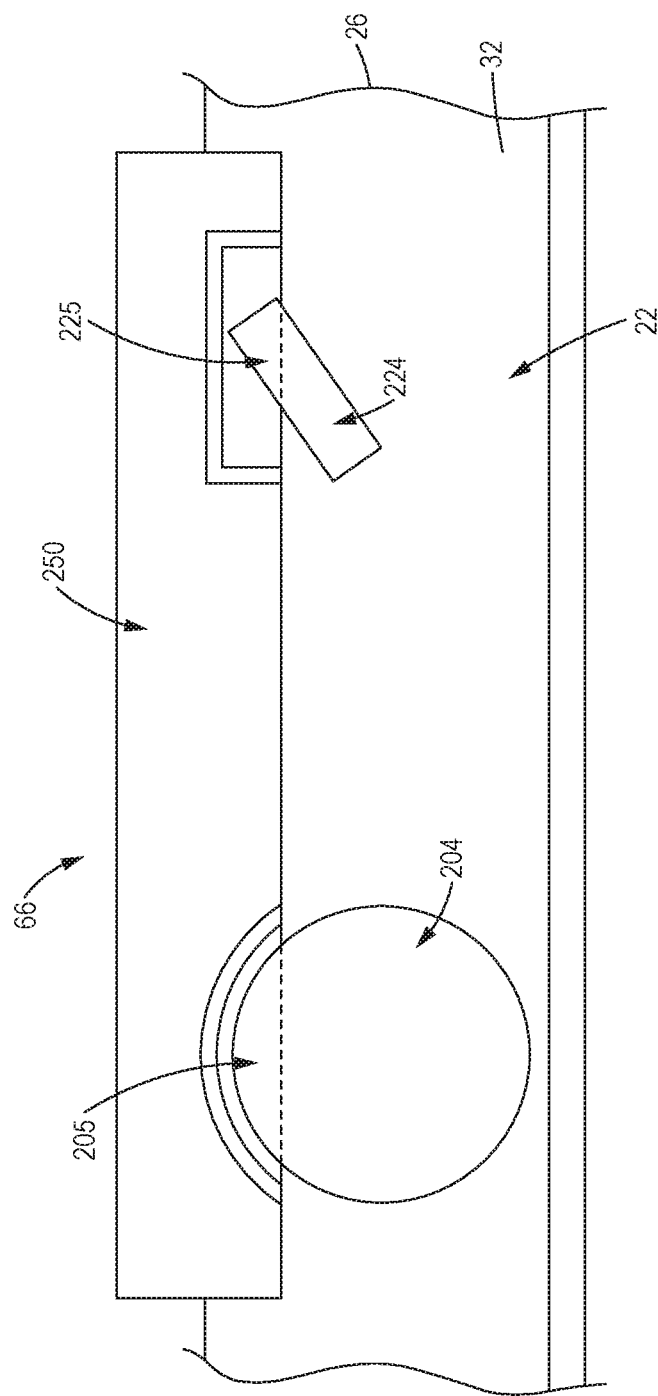
FIG. 13 is a diagrammatic side view of the abrasion assembly and the guard assembly of FIG. 12.
Figure 14:
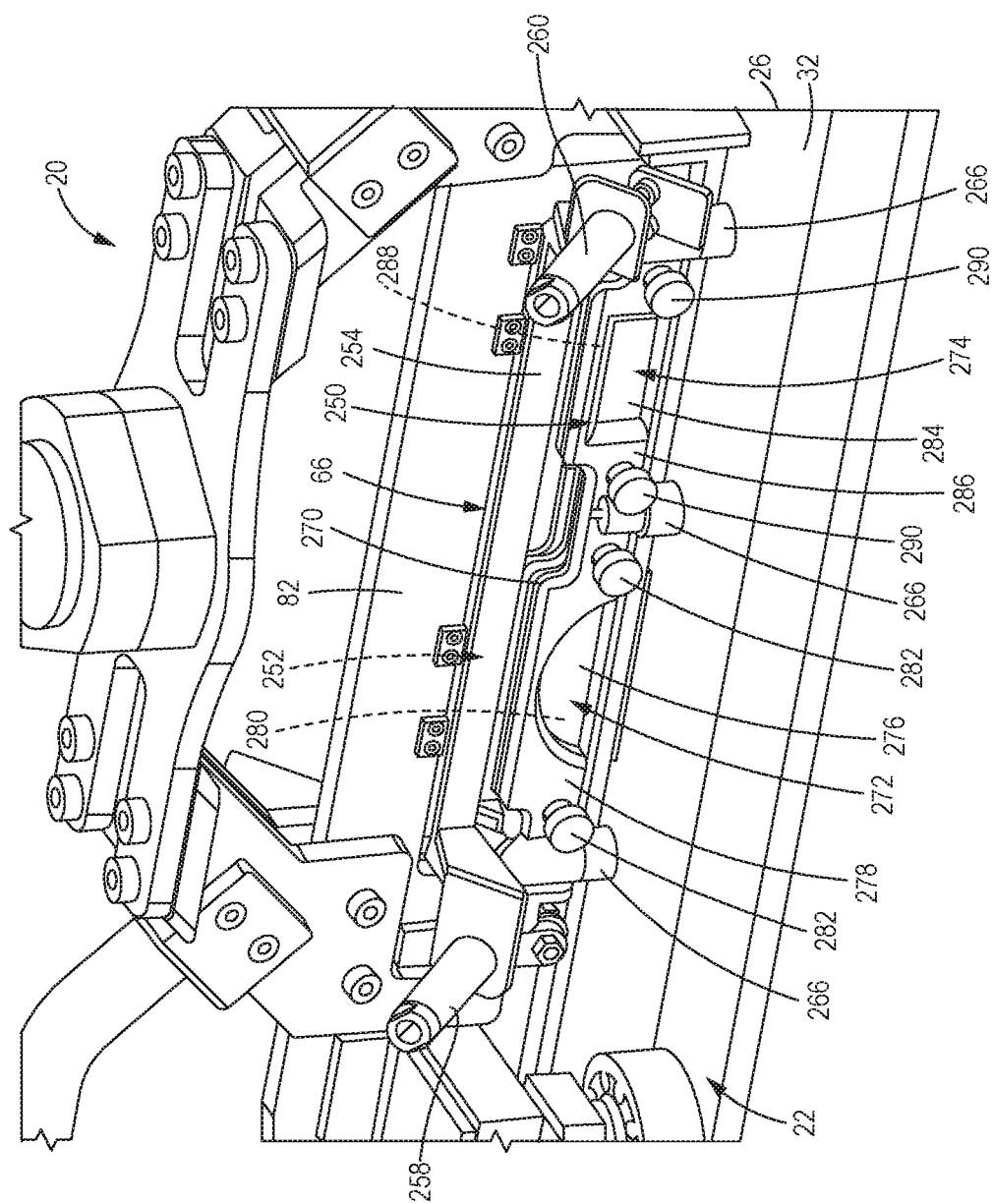
FIG. 14 is a perspective view of the guard assembly forming part of the abrading apparatus of FIG. 1.
Figure 15:
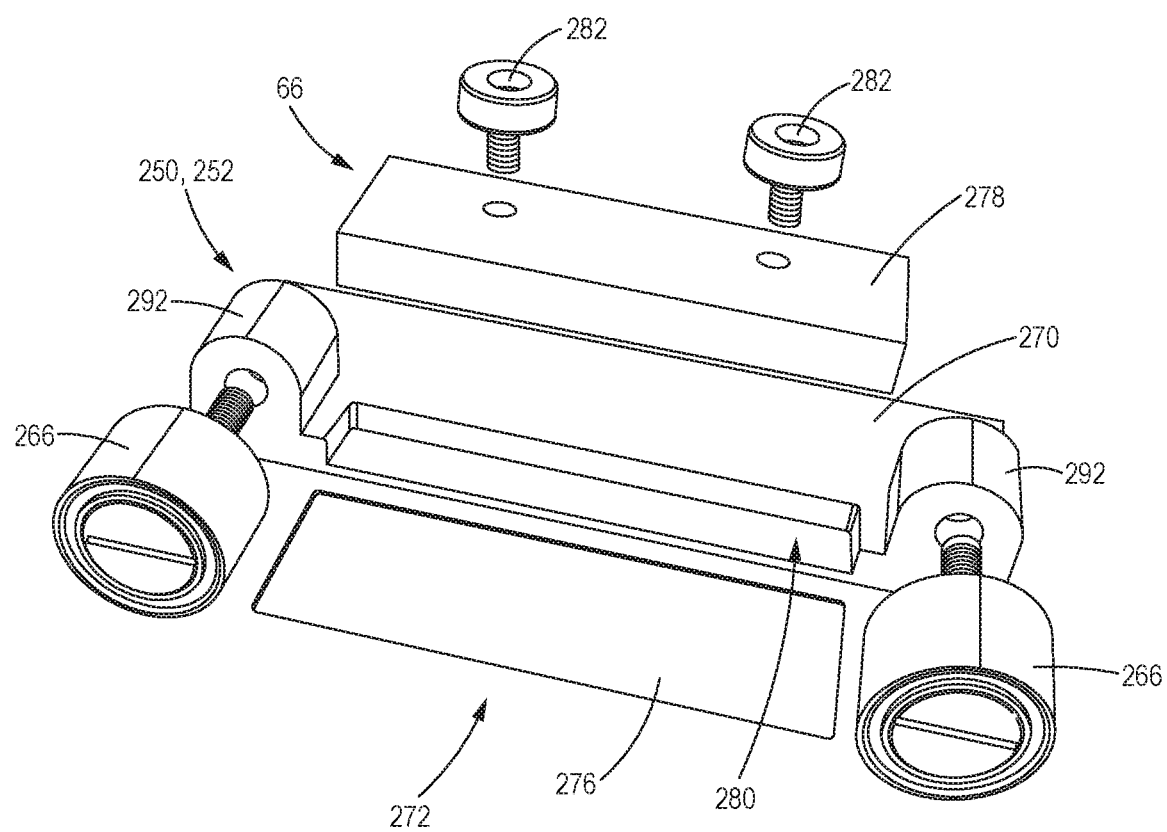
FIG. 15 is an exploded perspective view of a portion of the guard assembly of FIG. 14.

In operation, each of the abrasion devices generates an effective contact area in contact with the web 26. The term "effective contact area" as used herein refers to the area of the abrasive surface in contact with a surface being sanded. For example, as best shown with reference to FIGS. 12 and 13, each of the first and second orbital sanders 130, 132 includes an orbital sander element 200 with an orbital sander surface 202. The orbital sander surface 202 has an orbital sander effective contact area 204. One example of a profile of the orbital sander effective contact area 204 is shown in FIG. 13. Similarly, each of the first and second rotary sanders 134, 136 has a rotary sander element 220 that includes a rotary sander surface 222 (FIG. 11). The rotary sander surface defines a rotary sander effective contact area 224, an exemplary profile of which is shown in FIG. 13.

The guard assembly 66 overlies portions of the abrasion device effective contact areas, thereby to prevent sanding of certain portions of the web 26. As noted above, the stringer 22 may have certain areas, such as the cap edge treatment 40, that are not to be sanded. The guard assembly 66 is positioned to protect those areas, thereby permitting sanding only where it is intended. Furthermore, providing the guard assembly 66 on the abrading apparatus 20 eliminates the need to separately mask off or otherwise cover the areas that are not to be treated.

As best shown in FIGS. 1 and 12-15, the guard assembly 66 includes first and second guards 250, 252 coupled to opposite sides of the frame 82. Each of the first and second guards 250, 252 is positioned between the abrasion devices on one side of the abrading apparatus 20 and the frame 82, and is configured to extend over portions of the abrasion device effective contact areas. For example, as shown in FIG. 13, the first guard 250 extends over portions of both the first orbital sander effective contact area 204 and the first rotary sander effective contact area 224 to define blocked contact area portions 205, 225. The second guard 252 similarly extends over the second orbital sander effective contact area and the second rotary sander effective contact area. Thus, the first and second guards 250, 252 block portions 205, 225 of the abrasion device effective contact areas, thereby to prevent abrasion of portions of the web 26. In some examples, the location of the first and second guards 250, 252 corresponds to specific features of the web 26. For example, the first and second guards 250, 252 may be positioned to cover the cap edge treatment section 40 of the web 26.

The guard assembly 66 is further configured to adjust to variations in web thickness. With continued reference to FIGS. 1, 12, and 14, the guard assembly 66 further includes first and second guard brackets 254, 256 coupled to opposite sides of the frame 82. The first and second guards 250, 252 are coupled to the first and second guard brackets 254, 256 via first and second guard actuators 258, 260, respectively. The first and second guard actuators 258, 260 have adjustable lengths to permit relative movement of the first and second guards 250, 252 relative to the first and second guard brackets 254, 256. In the illustrated example, the adjustable length of the first guard actuator 258 is along a first guard actuator axis 262, wherein the first guard actuator axis 262 extends laterally outward and at a 45° incline angle relative to the frame 82. Similarly, the adjustable length of the second guard actuator 260 is along a second guard actuator axis 264, wherein the second guard actuator axis 264 extends laterally outward and at a 45° incline angle relative to the frame 82. A first set of guard cam followers 266 is coupled to the first guard 250 and configured to engage the first web surface 32, while a second set of guard cam followers 268 is coupled to the second guard 252 and configured to engage the second web surface 34. The first and second guard actuators 258, 260 are configured to apply first and second guard actuator forces that respectively bias the first and second guards 250, 252 toward the frame 82 and into engagement with the first and second web surfaces 32, 34. The first and second sets of guard cam followers 266, 268, in turn, may generate first and second guard cam forces that overcome the first and second guard actuator forces, thereby permitting the first and second guards 250, 252 to move relative to the first and second guard brackets 254, 256, respectively. With the first and second guard actuator axes 262, 264 oriented outwardly and inclined relative to the frame 82, the first and second guards 250, 252 may accommodate variances in web thickness and height. In some applications, the first and second guard actuators 258, 260 may be provided as air cylinders.

The guard assembly 66 is further configured to facilitate removal and replacement of wear components subject to abrasion from the abrasion devices. As best shown with reference to FIGS. 12, 14, and 15, each of the first and second guards 250, 252 includes a shim base 270 with removable first and second shim sub-assemblies 272, 274. The first shim sub-assembly 272 includes a first shim plate 276 and a first shim retainer 278. The shim base 270 includes a first recess 280 for receiving an edge of the first shim plate 276. A portion of the first shim retainer 278 is configured for insertion into the first recess 280, thereby to sandwich the first shim plate 276 between the shim base 270 and the first shim retainer 278. First locking screws 282 extend through the first shim retainer 278 and the first shim plate 276 to mechanically engage with the shim base 270, thereby to secure the first shim plate 276. Similarly, the second shim sub-assembly 274 includes a second shim plate 284 and a second shim retainer 286 sized for partial insertion into a second recess 288 formed in the shim base 270. Second locking screws 290 extend through the second shim retainer 286 and the second shim plate 284 to mechanically engage with the shim base 270, thereby to secure the second shim plate 284.

As the first and second shim plates 276, 284 wear due to exposure to the abrasion devices, they may easily be removed and replaced. More specifically, shim replacement may include loosening the first or second locking screws 282 or 290, removing the first or second shim retainer 278 or 286, removing the existing first or second shim plate 276 or 284, positioning a replacement first or second shim plate 276 or 284 in the first or second recess 280 or 288, placing the first or second shim retainer 278 or 286 back in the first or second recess 280 or 288, and tightening the first or second locking screws 282 or 290. In the illustrated example, the shim base 270 includes bosses 292 for journally supporting the first and second sets of guard cam followers 266, 268.

Figure 16:
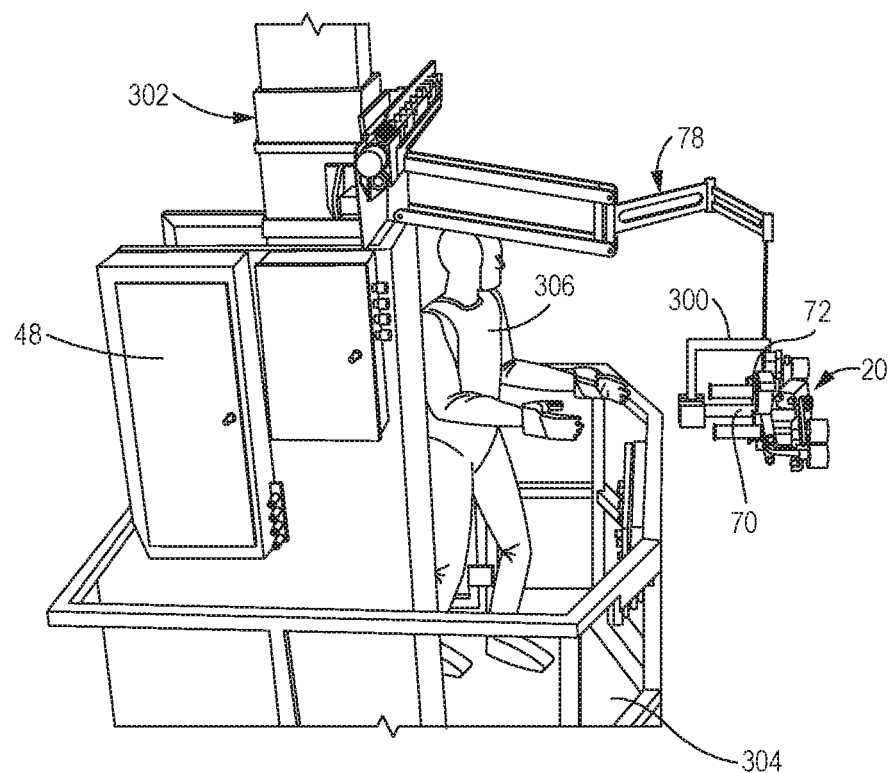
FIG. 16 is a perspective view of the abrading apparatus of FIG. 1 mounted on a lift arm.
Figure 17:
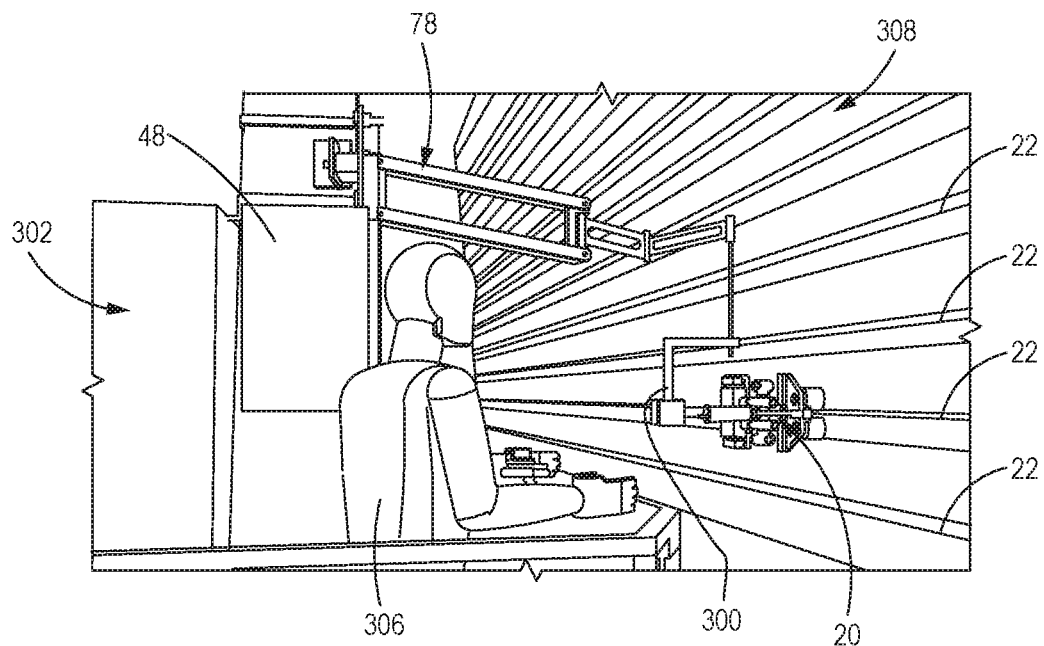
FIG. 17 is a perspective view of the abrading apparatus of FIG. 1 mounted on a lift arm and positioned to engage a stringer provided on a structure.

The adapter assembly 70 facilitates connection of the abrading apparatus 20 to the lift arm 78. As best shown in FIGS. 1, 16, and 17, the lift arm 78 includes a lift arm bracket 300 configured to directly couple with the lift adapter 72. The lift arm 78 is connected to a movable lift base 302. The movable lift base 302 may include a platform 304 for supporting an operator 306 during use of the abrading apparatus 20. The lift base 302 may also support the controller 48, in which case pneumatic, electrical, and any other connections between the controller 48 and the abrading apparatus 20 are routed through the lift arm 78, lift arm bracket 300, and lift adapter 72. Referring specifically to FIG. 17, the lift base 302 may be positioned so that the lift arm 78 supports the abrading apparatus 20 adjacent a structure 308 having multiple stringers 22. As the abrading apparatus 20 is operated and traverses one of the stringers 22, the lift base 302 also travels in the same direction along the structure 308, thereby to continuously support the weight of the abrading apparatus 20. The lift arm 78 and lift base 302 may be controlled automatically, manually by the operator 306, or a combination of both automatically and manually. In some applications, the lift arm 78 is a robotic arm while the lift base 302 is a pneumatic lift system.

Figure 18:
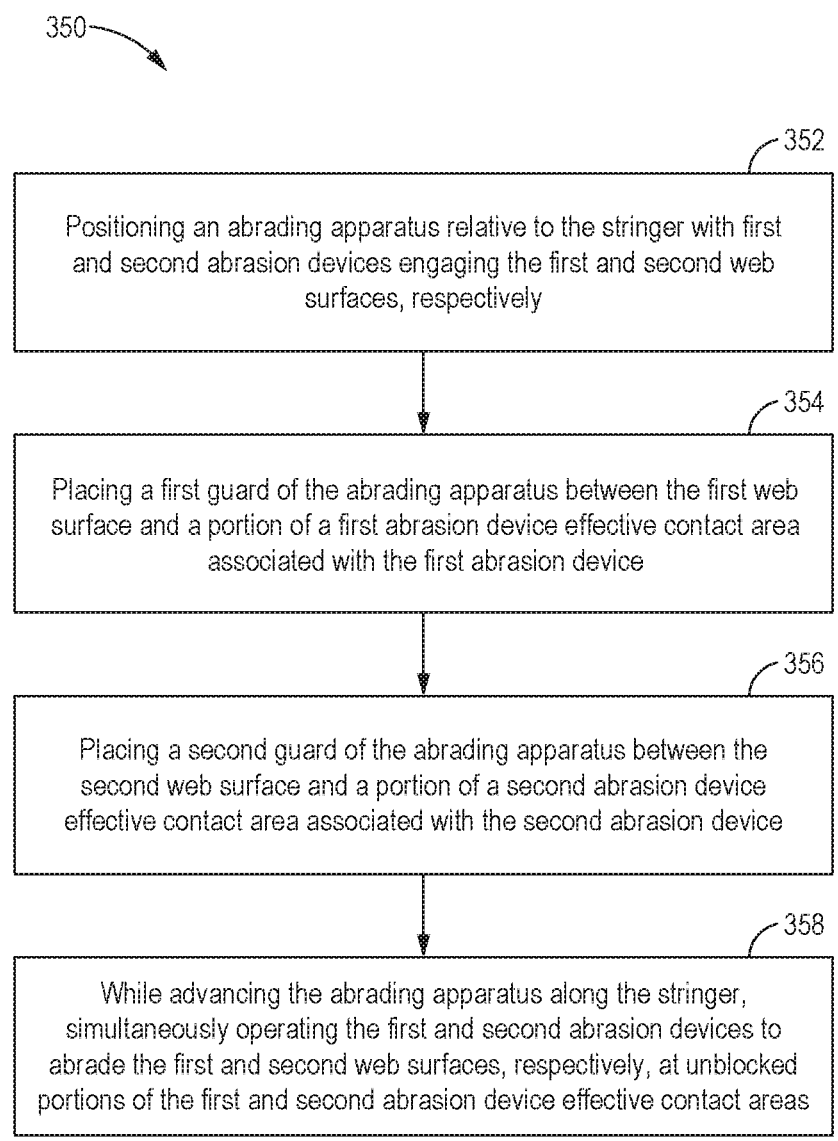
FIG. 18 is a block diagram of a method of abrading a stringer, according to the present disclosure.

A method 350 of abrading the stringer 22 is schematically illustrated by the block diagram of FIG. 18. The method 350 begins at block 352 by positioning the abrading apparatus 20 relative to the stringer 22. More specifically, the abrading apparatus 20 is positioned with first and second abrasion devices engaging the first and second web surfaces 32, 34, respectively. In some applications, the lift arm 78 is used to position the abrading apparatus 20 relative to the stringer 22. The method 350 continues at block 354 by placing the first guard 250 of the abrading apparatus 20 between the first web surface 32 and a portion of a first abrasion device effective contact area associated with the first abrasion device. At block 356, the second guard 252 of the abrading apparatus 20 is placed between the second web surface 34 and a portion of a second abrasion device effective contact area associated with the second abrasion device. At block 358, the method 350 includes advancing the abrading apparatus 20 along the stringer 22 while simultaneously operating the first and second abrasion devices to abrade the first and second web surfaces 32, 34, respectively, at unblocked portions of the first and second abrasion device effective contact areas. In some applications, the lift arm 78 is used to support the weight of the abrading apparatus 20 as it is advanced along the stringer 22.

Embodiments of the disclosure may find use in a variety of potential applications, particularly in the transportation industry, including for example, aerospace, marine, automotive applications.

It should be understood that the drawings are not necessarily drawn to scale and that the disclosed embodiments are sometimes illustrated schematically. It is to be further appreciated that the following detailed description is merely exemplary in nature and is not intended to limit the disclosure the application and uses thereof. Hence, although the present disclosure is, for convenience of explanation, depicted and described as certain illustrative embodiments, it will be appreciated that it can be implemented in various other types of embodiments and in various other systems and environments.

What is claimed is:

1. An abrading apparatus for use with an elongate part, the elongate part having a base and a web with a root end joined to the base and a free end opposite the root end, the web further defining opposed first and second web surfaces, the abrading apparatus comprising:
    a frame;
    a drive assembly coupled to the frame and configured to drive the abrading apparatus along a longitudinal length of the elongate part;
    an abrasion assembly including:
        a first abrasion device coupled to the frame and including a first abrasion element defining a first abrasion device effective contact area engageable with the first web surface; and
        a second abrasion device coupled to the frame and including a second abrasion element defining a second abrasion device effective contact area engageable with the second web surface;
    a guard assembly coupled to the frame and including:
        a first guard disposed between the frame and the first abrasion element, wherein the first guard extends over a portion of the first abrasion device effective contact area, the first guard being between the first web surface and a portion of the first abrasion device effective contact area associated with the first abrasion device; and
        a second guard disposed between the frame and the second abrasion element, wherein the second guard extends over a portion of the second abrasion device effective contact area, the second guard being between the second web surface and a portion of a second abrasion device effective contact area associated with the second abrasion device; and
    a controller for controlling operation of the drive assembly, the first abrasion device, and the second abrasion device.

2. The abrading apparatus of claim 1, in which the guard assembly further comprises:
    a first guard bracket coupled to the frame;
    a first guard actuator disposed between the first guard bracket and the first guard, wherein the first guard actuator has an adjustable length to permit relative movement between the first guard bracket and the first guard, the first guard actuator further being configured to apply a first guard actuator force biasing the first guard toward the frame;
    a second guard bracket coupled to the frame; and
    a second guard actuator disposed between the second guard bracket and the second guard, wherein the second guard actuator has an adjustable length to permit relative movement between the second guard bracket and the second guard, the second guard actuator further being configured to apply a second guard actuator force biasing the second guard toward the frame.

3. The abrading apparatus of claim 2, in which:
the adjustable length of the first guard actuator is along a first guard actuator axis, wherein the first guard actuator axis extends laterally outward and at a 45° incline angle relative to the frame; and
the adjustable length of the second guard actuator is along a second guard actuator axis, wherein the second guard actuator axis extends laterally outward and at a 45° incline angle relative to the frame.

4. The abrading apparatus of claim 2, further comprising:
a first set of guard cam followers coupled to the first guard bracket and configured to engage the first web surface; and
a second set of guard cam followers coupled to the second guard bracket and configured to engage the second web surface.

5. The abrading apparatus of claim 1, further comprising:
a first power operated slide coupled between the frame and the first abrasion device and movable to adjust a position of the first abrasion device in a lateral direction; and
a second power operated slide coupled between the frame and the second abrasion device, the second power operated slide movable to adjust a position of the second abrasion device in the lateral direction; and
wherein the controller is operably coupled to the first and second power operated slides.

6. The abrading apparatus of claim 5, in which the first abrasion device is coupled to the first power operated slide with a first gimbal joint, and the second abrasion device is coupled to the second power operated slide with a second gimbal joint.

7. The abrading apparatus of claim 6, further comprising:
a first pair of abrasion device cam followers coupled to the first abrasion device and configured to engage the first web surface, wherein the first pair of abrasion device cam followers are positioned on opposite sides of the first abrasion device; and
a second pair of abrasion device cam followers coupled to the second abrasion device and configured to engage the second web surface, wherein the second pair of abrasion device cam followers are positioned on opposite sides of the second abrasion device.

8. The abrading apparatus of claim 7, in which a first lateral spacing between the first pair of abrasion device cam followers and the first abrasion device defines a first cutting depth at which the first abrasion device abrades the first web surface, and a second lateral spacing between the second pair of abrasion device cam followers and the second abrasion device defines a second cutting depth at which the second abrasion device abrades the second web surface.

9. The abrading apparatus of claim 8, in which:
a first cam force, generated by engagement of the first pair of abrasion device cam followers with the first web surface and directed away from the frame, is greater than a first bias force, applied by the first power operated slide on the first abrasion device and directed toward the frame, thereby to move the first abrasion device away from the frame; and
a second cam force, generated by engagement of the second pair of abrasion device cam followers with the second web surface and directed away from the frame, is greater than a second bias force, applied by the second power operated slide on the second abrasion device and directed toward the frame, thereby to move the second abrasion device away from the frame.

10. The abrading apparatus of claim 1, further comprising a movable lift arm coupled to the frame and configured support the abrading apparatus independent of the elongate part.

11. The abrading apparatus of claim 1, in which the drive assembly comprises:
a first drive motor operably coupled to a first wheel and responsive to a first drive signal to rotate the first wheel at a first rotational speed;
a second drive motor operably coupled to a second wheel and responsive to a second drive signal to rotate the second wheel at a second rotational speed; and
an encoder coupled to the frame and configured to determine an actual traverse distance of the frame along the elongate part;
wherein the controller is operably coupled to the first drive motor, the second drive motor, and the encoder, and is programmed to:
generate the first and second drive signals;
calculate a command traverse distance based on the first and second drive signals; compare the command traverse distance with the actual traverse distance from the encoder; and
generate a slip signal when the command traverse distance exceeds the actual traverse distance by a threshold slip distance.

12. An abrading apparatus for use with a stringer, the stringer having a base and a web having a root end joined to the base and a free end opposite the root end, the web further defining opposed first and second web surfaces, the abrading apparatus comprising:
a frame;
a drive assembly coupled to the frame and configured to drive the abrading apparatus along a longitudinal length of the stringer;
an abrasion assembly including:
a first carriage coupled to the frame by a first power operated slide;
a first rotary sander coupled to the first carriage and including a first rotary sander element having a first rotary sander surface, the first rotary sander surface defining a first rotary sander effective contact area engageable with the first web surface;
a first orbital sander coupled to the first carriage and including a first orbital sander element having a first orbital sander surface, the first orbital sander surface defining a first orbital sander effective contact area engageable with the first web surface;
a second carriage coupled to the frame by a second power operated slide;
a second rotary sander coupled to the second carriage and including a second rotary sander element having a second rotary sander surface, the second rotary sander surface defining a second rotary sander effective contact area engageable with the second web surface; and
a second orbital sander coupled to the second carriage and including a second orbital sander element having a second orbital sander surface, the second orbital sander surface defining a second orbital sander effective contact area engageable with the second web surface;
a guard assembly coupled to the frame and including:
a first guard positioned to extend over portions of the first rotary sander effective contact area and the first orbital sander effective contact area, the first guard being between the first web surface and the portion of the first orbital sander effective contact area associated with the first orbital sander;

a second guard positioned to extend over portions of the second rotary sander effective contact area and the second orbital sander effective contact area, the second guard being between the second web surface and the portion of the second orbital sander effective contact area associated with the second orbital sander; and a controller for controlling operation of the drive assembly, the first rotary sander, the first orbital sander, the second rotary sander, the second orbital sander, the first power operated slide, and the second power operated slide.

13. The abrading apparatus of claim 12, in which the guard assembly further comprises:

a first guard bracket coupled to the frame;

a first guard actuator disposed between the first guard bracket and the first guard, wherein the first guard actuator has an adjustable length to permit relative movement between the first guard bracket and the first guard, the first guard actuator further being configured to apply a first guard actuator force biasing the first guard toward the frame;

a second guard bracket coupled to the frame; and a second guard actuator disposed between the second guard bracket and the second guard, wherein the second guard actuator has an adjustable length to permit relative movement between the second guard bracket and the second guard, the second guard actuator further being configured to apply a second guard actuator force biasing the second guard toward the frame.

14. The abrading apparatus of claim 13, further comprising:

a first set of guard cam followers coupled to the first guard bracket and configured to engage the first web surface; and a second set of guard cam followers coupled to the second guard bracket and configured to engage the second web surface.

15. The abrading apparatus of claim 12, further comprising a movable lift arm coupled to the frame and configured support the abrading apparatus independent of the stringer.

16. A method of abrading a stringer, the stringer having a base and a web having a root end joined to the base and a free end opposite the root end, the web further defining opposed first and second web surfaces, the method comprising:

positioning an abrading apparatus relative to the stringer with first and second abrasion devices engaging the first and second web surfaces, respectively;

placing a first guard of the abrading apparatus between the first web surface and a portion of a first abrasion device effective contact area associated with the first abrasion device;

placing a second guard of the abrading apparatus between the second web surface and a portion of a second abrasion device effective contact area associated with the second abrasion device; and while advancing the abrading apparatus along the stringer, simultaneously operating the first and second abrasion devices to abrade the first and second web surfaces, respectively, at unblocked portions of the first and second abrasion device effective contact areas.

17. The method of claim 16, further comprising supporting the abrading apparatus independent of the stringer with a lift arm.

18. The method of claim 17, in which positioning the abrading apparatus relative to the stringer comprises moving the lift arm relative to the stringer until the first and second abrasion devices of the abrading apparatus engage the first and second web surfaces, respectively.

19. The method of claim 17, in which the lift arm supports the abrading apparatus while advancing the abrading apparatus along the stringer.

20. The method of claim 16, further comprising, while advancing the abrading apparatus along the stringer:

calculating a command traverse distance for the abrading apparatus;

measuring an actual traverse distance of the abrading apparatus;

comparing the command traverse distance with the actual traverse distance; and generating a slip signal when the command traverse distance exceeds the actual traverse distance by a threshold slip distance.

* * * * *